United States Patent
Takeda

(10) Patent No.: US 10,514,760 B2
(45) Date of Patent: Dec. 24, 2019

(54) TACTILE SENSATION PROVIDING APPARATUS AND ELECTRONIC DEVICE

(71) Applicant: KYOCERA Corporation, Kyoto (JP)

(72) Inventor: Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/771,151

(22) PCT Filed: Nov. 9, 2016

(86) PCT No.: PCT/JP2016/004847
§ 371 (c)(1),
(2) Date: Apr. 26, 2018

(87) PCT Pub. No.: WO2017/081868
PCT Pub. Date: May 18, 2017

(65) Prior Publication Data
US 2018/0321749 A1 Nov. 8, 2018

(30) Foreign Application Priority Data
Nov. 12, 2015 (JP) ................. 2015-222465

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC .................................. G06F 3/016; G08B 6/00
See application file for complete search history.

(56) References Cited

U.S. PATENT DOCUMENTS

| | | | |
|---|---|---|---|
| 9,182,821 B2 | 11/2015 | Adachi et al. | |
| 2007/0035526 A1 | 2/2007 | Takenaka et al. | |
| 2012/0326999 A1* | 12/2012 | Colgate | G06F 3/016 345/173 |
| 2014/0104203 A1 | 4/2014 | Adachi et al. | |
| 2017/0097681 A1* | 4/2017 | Ono | G06F 3/0412 |

FOREIGN PATENT DOCUMENTS

| | | | |
|---|---|---|---|
| JP | 2007-034954 A | | 2/2007 |
| JP | 2007034954 | * | 2/2007 |
| JP | 2010-015514 A | | 1/2010 |
| JP | 4975722 B2 | | 7/2012 |
| JP | 2014-099140 A | | 5/2014 |
| WO | 2012/090847 A1 | | 7/2012 |
| WO | 2012/161061 A1 | | 11/2012 |
| WO | 2015/151380 A1 | | 10/2015 |

* cited by examiner

*Primary Examiner* — Hongmin Fan
(74) *Attorney, Agent, or Firm* — Studebaker & Brackett PC

(57) ABSTRACT

A tactile sensation providing apparatus includes a base, a panel having an interface surface, and a piezoelectric actuator that is attached to the base and the panel and configured to allow lateral movement of the panel with respect to the interface surface. The panel moves laterally with respect to the interface surface in accordance with bending of the piezoelectric actuator to provide a tactile sensation on the interface surface.

4 Claims, 8 Drawing Sheets

TACTILE SENSATION PROVIDING APPARATUS AND ELECTRONIC DEVICE

CROSS REFERENCE TO RELATED APPLICATION

This application claims priority to and the benefit of Japanese Patent Application No. 2015-222465 (filed on Nov. 12, 2015), the entire contents of which are incorporated herein by reference.

TECHNICAL FIELD

The present disclosure relates to a tactile sensation providing apparatus and an electronic device.

BACKGROUND

Apparatuses capable of providing tactile feedback to, for example, a user's fingertip are known. Typical examples of such apparatuses include apparatuses that provide a tactile sensation to a user's fingertip and the like via a touch panel in response to operation to the touch panel (e.g., PLT 1 set forth below). Such apparatuses are capable of, in response to a user operation to, for example, the touch panel, informing the user that the apparatus has recognized the user operation by vibrating the touch panel in contact with the user's fingertip and the like.

CITATION LIST

Patent Literature

PLT 1: Japanese Patent No. 4975722

SUMMARY

A tactile sensation providing apparatus according to an embodiment of the present disclosure includes a base and a panel having an interface surface. The tactile sensation providing apparatus includes a piezoelectric actuator that is attached to the base and the panel and configured to allow lateral movement of the panel with respect to the interface surface. In the tactile sensation providing apparatus, the panel moves laterally with respect to the interface surface in accordance with bending of the piezoelectric actuator to provide a tactile sensation on the interface surface.

An electronic device according to an embodiment of the present disclosure includes a tactile sensation providing apparatus. The tactile sensation providing apparatus includes a base and a panel having an interface apparatus. The tactile sensation providing apparatus includes a piezoelectric actuator that is attached to the base and the panel and configured to allow lateral movement of the panel with respect to the interface surface. In the tactile sensation providing apparatus, the panel moves laterally with respect to the interface surface in accordance with bending of the piezoelectric actuator to provide a tactile sensation on the interface surface.

DETAILED DESCRIPTION

Figure 1:
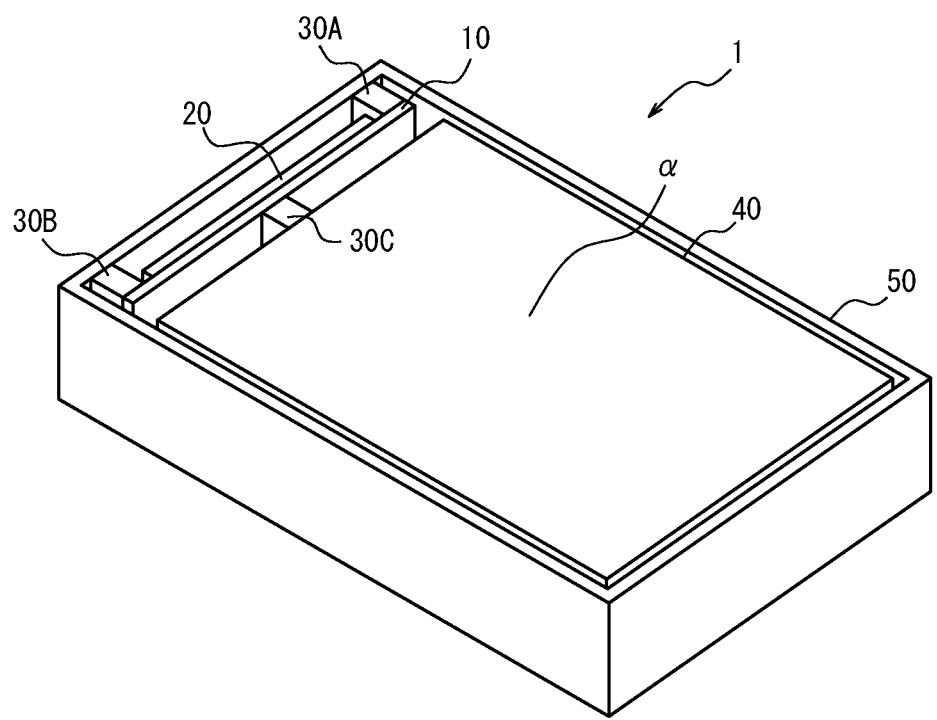
FIG. 1 is a perspective view of an example appearance of a tactile sensation providing apparatus according to a first embodiment.
Figure 1:
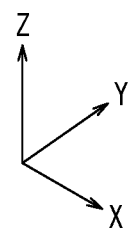

In order to provide a favorable operational feeling to a user in a tactile sensation providing apparatus, technologies for presenting a favorable tactile sensation, such as a click sensation acquired by the user when the user presses a mechanical key or button, are desirable. Recently, there is a growing demand for reductions in size and weight of electronic devices. There also is a demand for techniques to efficiently provide the tactile sensation in a limited space and/or with a small amount of power.

In the embodiments described below, as examples of the tactile sensation providing apparatus, an apparatus that provides an operational feeling to the user by providing a tactile sensation on a panel will be described. This apparatus is capable of providing the tactile sensation to the user's fingertip in contact with the panel, in response to a user operation in respect of, for example, the panel. This apparatus is capable of providing the tactile sensation to a tool, such as a stylus pen, in contact with the panel. When receiving the operational feeling acquired through the tactile sensation at the fingertip, the user is able to recognize that the apparatus has received an input according to the user operation.

Electronic devices equipped with the tactile sensation providing apparatus may include, for example, mobile phones, smartphones, phablets, and tablet computers. The electronic devices equipped with the tactile sensation providing apparatus are not limited thereto. Electronic devices equipped with the tactile sensation providing apparatus may be any electronic devices having a panel for providing a tactile sensation including, for example, PDAs, remote controls, portable music players, and video game consoles. Electronic devices equipped with the tactile sensation providing apparatus are not limited to these mobile electronic devices. Electronic devices equipped with the tactile sensation providing apparatus are also applicable to any apparatuses with a panel including, for example, desktop computers, ATMs, and ticket vending machines at railway stations.

Electronic devices equipped with a panel may be employed as automotive control panels embedded in the steering of a vehicle, car navigation systems, dashboards, and the like. Electronic devices equipped with a panel may also be employed by vehicles other than automobiles. The electronic devices equipped with a panel may be employed by not only vehicles but also various electronic devices including household appliance.

A tactile sensation providing apparatus according to an embodiments of the present disclosure may be used for, but not limited to, an electronic device equipped with a touch sensor. Hereinafter, in order to focus on the provision of the tactile sensation, the tactile sensation providing apparatus according to the present embodiments is described as an apparatus equipped with a panel. Descriptions of functions for detecting a contact position by a touch sensor and the like will be omitted.

First Embodiment

Example Configuration

Figure 2A:
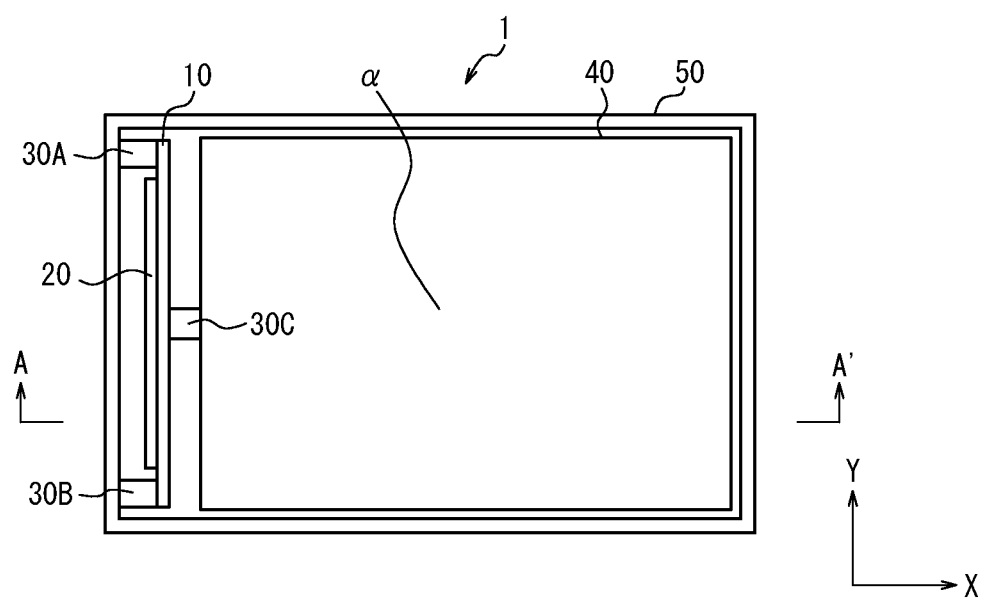
FIG. 2A is a diagram illustrating the tactile sensation providing apparatus of FIG. 1 viewed in a negative Z-axis direction.
Figure 2B:
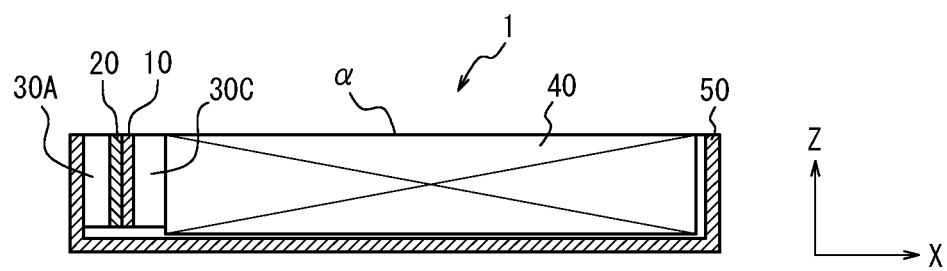
FIG. 2B is a cross-sectional view taken from line A-A' of FIG. 2A.
Figure 3A:
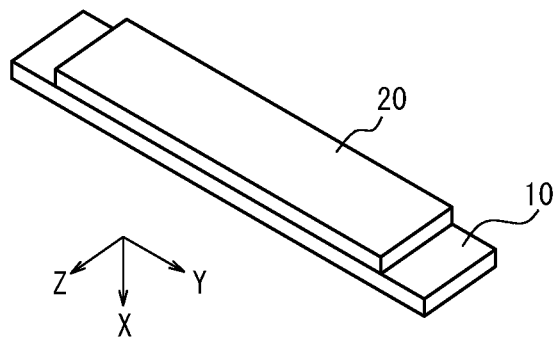
FIG. 3A is a perspective view of an example appearance of a piezoelectric actuator according to the first embodiment.
Figure 3B:
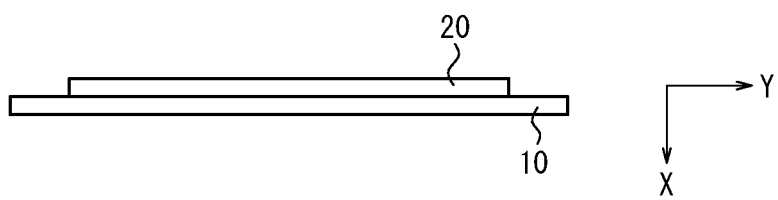
FIG. 3B is a side view of the piezoelectric actuator of FIG. 3A viewed in the negative Z-axis direction.
Figure 3C:
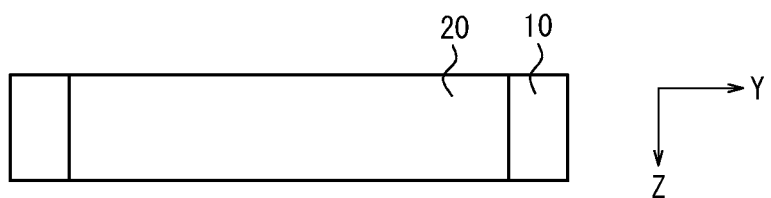
FIG. 3C is a top view of the piezoelectric actuator of FIG. 3A viewed in a positive X-axis direction.
Figure 3D:
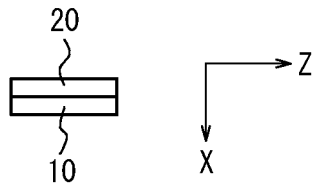
FIG. 3D is a side view of the piezoelectric actuator of FIG. 3A viewed in a positive Y-axis direction.

As illustrated in FIG. 1 and FIGS. 2A and 2B, a tactile sensation providing apparatus 1 according to a first embodiment includes a plate-like member 10 and a piezoelectric element 20 supported by the plate-like member 10. According to the present embodiment, a component made up of the plate-like member 10 and the piezoelectric element 20 will also be collectively referred to as a piezoelectric actuator (10, 20).

As illustrated in FIGS. 3A, 3B, 3C and 3D, the piezoelectric actuator according to the present embodiment includes the plate-like member 10 and the piezoelectric element 20. FIGS. 3A to 3D illustrate the piezoelectric actuator removed from the tactile sensation providing apparatus 1 illustrated in FIG. 1 and FIGS. 2A and 2B. The piezoelectric element 20 may be attached to the plate-like member 10. The piezoelectric element 20 may be supported by the plate-like member 10 being attached thereto. To attach the piezoelectric element 20 to the plate-like member 10, an adhesive or a double-sided tape, for example, may be appropriately used.

In the example illustrated in FIGS. 3A to 3D, the plate-like member 10 may facilitate attachment between the piezoelectric element 20 and another element. In other words, the connection between the plate-like member 10 and another element eliminates the necessity for attachment of the piezoelectric element 20 directly to the another element. The plate-like member 10 may be a thin metal or ceramic plate, such as a shim plate, made of a suitable material having appropriate rigidity. If the rigidity of the plate-like member 10 is too high, the piezoelectric element 20 attached to the plate-like member 10 may be inhibited from bending, in which case the tactile sensation to be provided may be reduced. On the other hand, if the rigidity of the plate-like member 10 is too low, the plate-like member 10 may have insufficient strength for attachment to another member. High rigidity may also be referred to as great rigidity. Low rigidity may also be referred to as small rigidity.

Upon application of an electric signal, the piezoelectric element 20 expands and contracts, or bends, in accordance with an electromechanical coupling coefficient of its forming material. The electric signal applied to the piezoelectric element 20 may be a voltage. The piezoelectric element 20 may include, for example, ceramic or crystal. The piezoelectric actuator illustrated in FIGS. 3A to 3D is a unimorph piezoelectric actuator in which the piezoelectric element 20 is adhered to one side of the plate-like member 10.

In the piezoelectric actuator illustrated in FIGS. 3A to 3D, the piezoelectric element 20 expands and contracts upon application of the electric signal. However, the plate-like member 10 having the piezoelectric element 20 attached thereto does not expand or contract upon application of the electric signal. Thus, the piezoelectric actuator bends upon application of a voltage to the piezoelectric element 20. When bending, the piezoelectric actuator generates a waveform. This waveform generated by the bend includes a node at either longitudinal end of the piezoelectric actuator. This waveform includes an antinode at the longitudinal center of the piezoelectric actuator. The longitudinal direction of the piezoelectric actuator corresponds to a Y-axis direction. The waveform generated by the bend has amplitude in an X-axis direction. For example, when the piezoelectric actuator bends in a positive X-axis direction upon application of a voltage with a certain polarity to the piezoelectric element 20, the piezoelectric actuator will bend in the negative X-axis direction upon application of a voltage with a reversed polarity to the piezoelectric element 20.

The piezoelectric actuator illustrated in FIGS. 3A to 3D may include the plate-like member 10 and the piezoelectric element 20 as a typical example of a simple configuration. The piezoelectric actuator may further include, for example, another joining member, adhesive member, and/or reinforcing member. The piezoelectric actuator may include, for example, the piezoelectric element 20 alone, omitting the plate-like member 10.

The piezoelectric actuator employed for the tactile sensation providing apparatus 1 according to the present embodiment is not limited to the unimorph piezoelectric actuator as illustrated in FIGS. 3A to 3D. The tactile sensation providing apparatus 1 according to the present embodiment may employ other types of piezoelectric actuator. The tactile sensation providing apparatus 1 according to the present embodiment may employ, for example, a bimorph piezoelectric actuator.

Figure 4A:
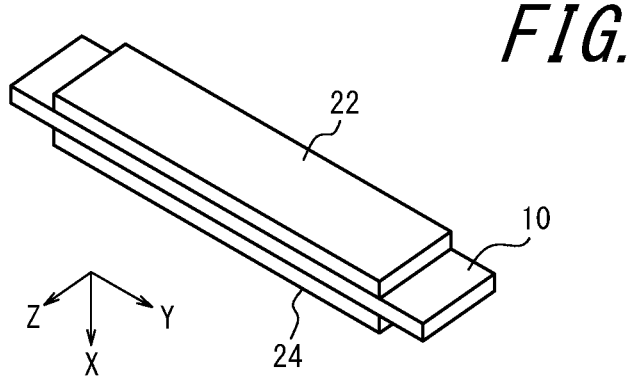
FIG. 4A is a perspective view of an example appearance of a bimorph piezoelectric actuator.
Figure 4B:
FIG. 4B is a side view of the piezoelectric actuator of FIG. 4A viewed in the negative Z-axis direction.
Figure 4C:
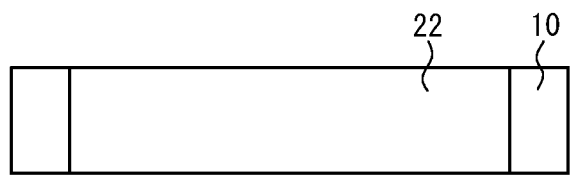
FIG. 4C is a top view of the piezoelectric actuator of FIG. 4A viewed in the positive X-axis direction.
Figure 4D:
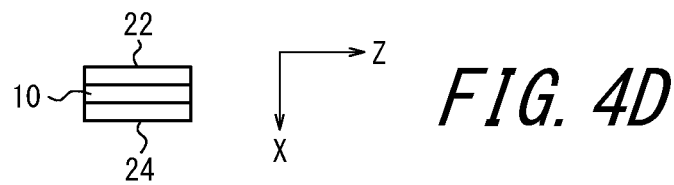
FIG. 4D is a side view of the piezoelectric actuator of FIG. 4A viewed in the positive Y-axis direction.

The piezoelectric actuator illustrated in FIGS. 4A, 4B, and 4D includes the plate-like member 10 and two piezoelectric elements 22 and 24. FIGS. 4A to 4D, similarly to FIGS. 3A to 3D, illustrate the piezoelectric actuator removed from the tactile sensation providing apparatus 1 illustrated in FIG. 1 and FIGS. 2A and 2B. The piezoelectric actuator illustrated in FIGS. 4A to 4D is a bimorph actuator. In the bimorph actuator, the piezoelectric elements 22 and 24 are attached to corresponding sides of the plate-like member 10. The piezoelectric elements 22 and 24 may be attached to the plate-like member 10. The piezoelectric elements 22 and 24 may be supported by the plate-like member 10 being attached thereto. To attach the piezoelectric elements 22 and 24 to the plate-like member 10, adhesive or double-sided tape may be appropriately used.

The bimorph piezoelectric actuator as illustrated in FIGS. 4A to 4D may be configured such that the piezoelectric elements 22 and 24 bend in the same direction, by appropriately adjusting the polarities of the voltages applied to the piezoelectric elements 22 and 24. When bending in this manner, the bimorph piezoelectric actuator generates waveforms. The waveforms each include a node at either longitudinal end of the piezoelectric actuator. The waveforms each include an antinode at the longitudinal center of the piezoelectric actuator. The longitudinal direction of the piezoelectric actuator corresponds to the Y-axis direction. The waveforms generated by the bending each have amplitude in the X-axis direction. Thus, the bimorph piezoelectric actuator bends upon application of an electric signal. The electric signal applied to the bimorph piezoelectric actuator may be a voltage. The bimorph piezoelectric actuator may bend more than the unimorph piezoelectric actuator. The bimorph piezoelectric actuator may bend more powerfully than the unimorph piezoelectric actuator.

The piezoelectric actuator illustrated in FIGS. 4A to 4D includes the plate-like member 10 and the piezoelectric elements 22 and 24, as a typical example of a simple configuration. The piezoelectric actuator may further include, for example, another joining member, adhesive member, and/or reinforcing member. The piezoelectric actuator may include, for example, a laminated piezoelectric element. The laminated piezoelectric element includes a laminated bimorph element. The laminated piezoelectric element may have a multilayer structure configured with a plurality of dielectric layers made of, for example, PZT (Pb Zirconate Titanate) and electrode layers disposed between the plurality of dielectric layers. PZT is also referred to as lead zirconate titanate.

The tactile sensation providing apparatus 1 according to the present embodiment may employ any one of the piezoelectric actuator illustrated in FIGS. 3A to 3D and the piezoelectric actuator illustrated in FIGS. 4A to 4D. Hereinafter, the tactile sensation providing apparatus 1 employing the unimorph piezoelectric actuator illustrated in FIGS. 3A to 3D will be discussed.

As illustrated in FIG. 1 and FIGS. 2A and 2B, in the tactile sensation providing apparatus 1 according to the present embodiment, connecting portions 30A, 30B and 30C are coupled to the piezoelectric actuators 10 and 20. The tactile sensation providing apparatus 1 according to the present embodiment includes a panel 40 and a base 50.

As illustrated in FIG. 1 and FIGS. 2A and 2B, the panel 40 includes an interface surface α configured to provide a tactile sensation to the user's fingertip and the like. The interface surface α may function as an operation surface of the panel 40 to allow operations to be performed by the user's fingertip and the like. The panel 40 may be formed from any suitable material, such as plastic, synthetic resin, glass, or metal, having appropriate rigidity for providing a tactile sensation to the user's fingertip and the like.

The panel 40 is not limited to the structure as illustrated in FIG. 1 and FIGS. 2A and 2B. For example, the panel 40 may have a structure with a hollow space on the rear side of the interface surface α, or a structure with a solid inside. In FIG. 1 and FIGS. 2A and 2B, the panel 40 has a relatively large thickness (the size in the Z-axis direction). The panel 40 may have any appropriate thickness in accordance with various requirements for, or a specification of, the tactile sensation providing apparatus 1.

The interface surface α of the panel 40 may be formed with a transparent member. In this case, a display may be provided on the rear side of the interface surface α. The interface surface α of the panel 40 may have a function to detect a contact position, similarly to a touch sensor. On the interface surface α of the panel 40, a member, such as the touch sensor, having a function to detect a contact position may be provided. Hereinafter, more detailed descriptions of a display function of the panel and the function to detect a contact position on the interface surface α of the panel 40 will be omitted.

The base 50 constitutes a base that supports the panel 40. The base 50 may constitute, for example, a housing of the tactile sensation providing apparatus 1. The base 50 may constitute a protection member for the panel 40 and/or the piezoelectric actuator. The base 50 may be made of any appropriate material, such as plastic, synthetic resin, glass, or metal, having appropriate rigidity. The base 50 is not limited to the configuration as illustrated in FIG. 1 and FIGS. 2A and 2B. The base 50 may have various shape and/or size in accordance with various requirements for, or a specification of, the tactile sensation providing apparatus 1.

In FIG. 1 and FIGS. 2A and 2B, the base 50 is illustrated in a simplified manner, for the purpose of explaining operation of the tactile sensation providing apparatus 1 according to the present embodiment. When the tactile sensation providing apparatus 1 is actually employed in an electronic device, a bezel may be formed on the base 50 to cover the peripheral edges of the interface surface α of the panel 40. In this way, the panel 40 may be prevented from protruding from the base 50 in, for example, the positive Z-axis direction.

According to the present embodiment, as illustrated in FIG. 1 and FIGS. 2A and 2B, the piezoelectric actuator (10, 20) is connected to the panel 40 and the base 50. The piezoelectric actuator (10, 20) according to the present embodiment may be connected to the panel 40 and the base 50 via connection units 30.

As illustrated in FIG. 1 and FIGS. 2A and 2B, the piezoelectric actuator (10, 20) is connected to the base 50 via connection units 30A and 30B. Longitudinal ends of the piezoelectric actuator (10, 20) may be connected to an inner wall of the base 50 via the connection units 30A and 30B. The longitudinal direction of the piezoelectric actuator (10, 20) corresponds to the Y-axis direction. The longitudinal ends of the piezoelectric actuator (10, 20) are not necessarily the exact longitudinal edges of the piezoelectric actuator (10, 20). The longitudinal ends of the piezoelectric actuator (10, 20) may be, for example, positions in the vicinity of either end of the piezoelectric element 20 or a portion in the vicinity of either end of the plate-like member 10. The longitudinal ends of the piezoelectric actuator (10, 20) may be, for example, rather than at the longitudinal edges thereof, at two locations spaced apart from each other by a certain distance in the longitudinal direction of the piezoelectric actuator. The longitudinal ends of the piezoelectric actuator (10, 20) located close to the longitudinal edges of the piezoelectric actuator (10, 20) may increase the amplitude caused by the bend of the piezoelectric actuator.

As illustrated in FIG. 1 and FIGS. 2A and 2B, the piezoelectric actuator (10, 20) is connected to the panel 40 via the connection unit 30C. The piezoelectric actuator (10, 20) may be connected to the panel 40 via the connection unit 30C at the longitudinal center of the piezoelectric actuator. The piezoelectric actuator (10, 20) may be connected to the panel 40 via the connection unit 30C at a central portion of a peripheral edge surface of the panel 40. The longitudinal center of the piezoelectric actuator (10, 20) does not necessarily need to be the exact center of the piezoelectric actuator (10, 20) in the longitudinal direction. As the longitudinal center of the piezoelectric actuator (10, 20) is closer to the center of the piezoelectric actuators (10, 20) in the longitudinal direction, the amplitude caused by bending of the piezoelectric actuator may become larger.

The longitudinal ends of the piezoelectric actuator (10, 20) may correspond to end portions of the plate-like member 10 or end portions of the piezoelectric element 20. Similarly, the longitudinal center of the piezoelectric actuators (10, 20) may correspond to the center of the plate-like member 10 or the center of the piezoelectric element 20.

As described above, in the tactile sensation providing apparatus 1 according to the present embodiment, the piezoelectric actuator (10, 20) is attached to the base 50 and the panel 40. The tactile sensation providing apparatus 1 may include the connection units 30 (30A, 30B, and 30C) connecting at least one of the base 50 and the panel 40 to the piezoelectric actuator (10, 20).

In the tactile sensation providing apparatus 1 according to the present embodiment, as described above, the piezoelectric actuator (10, 20) may be connected to the panel 40 at the longitudinal center of the piezoelectric actuator. In the tactile sensation providing apparatus 1 according to the present embodiment, the piezoelectric actuator (10, 20) may be attached to the central portion of the peripheral edge surface of the panel 40. In the tactile sensation providing apparatus 1 according to the present embodiment, the longitudinal ends of the piezoelectric actuator (10, 20) may be attached to the base 50.

Example of Operation

Figure 5A:
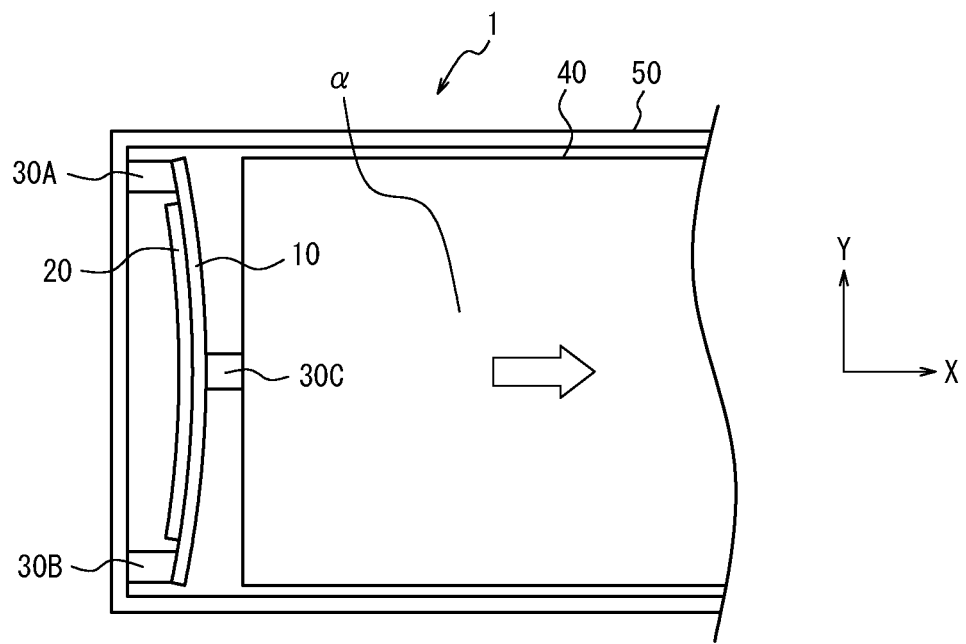
FIG. 5A is a diagram illustrating a state of the tactile sensation providing apparatus according to the first embodiment in which a panel 40 is displaced in the positive X-axis direction in response to application of a voltage to a piezoelectric element.
Figure 5B:
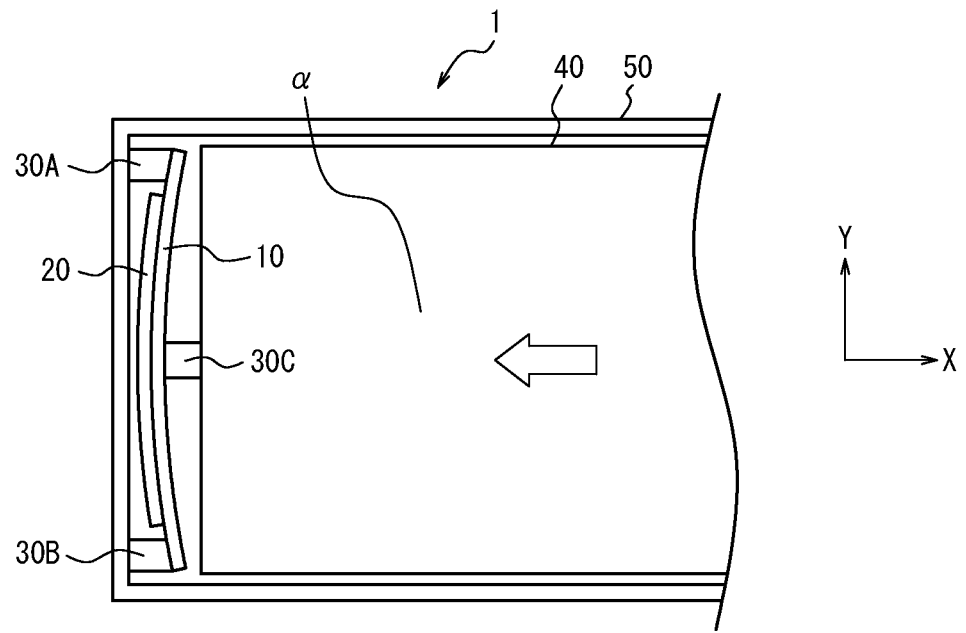
FIG. 5B is a diagram illustrating a state of the tactile sensation providing apparatus according to the first embodiment in which the panel 40 is displaced in a negative X-axis direction in response to the application of the voltage to the piezoelectric element.

As illustrated in FIG. 5A, when the piezoelectric actuator (10, 20) bends with the antinode in the positive X-axis direction upon application of a voltage to the piezoelectric element 20, the panel 40 connected to the piezoelectric actuator (10, 20) is displaced in the positive X-axis direction. As illustrated in FIG. 5B, when the piezoelectric actuator (10, 20) bends with the antinode in the negative X-axis direction upon application of a voltage to the piezoelectric element 20, the panel 40 connected to the piezoelectric actuator (10, 20) is displaced in the negative X-axis direction. When the user's finger and the like is in contact with the interface surface α of the panel 40 upon drive of the piezoelectric actuator, the tactile sensation providing apparatus 1 may provide a tactile sensation to the user's fingertip and the like on the interface surface α.

A press operation in respect of the interface surface α of the panel 40 performed by the user corresponds to a movement that includes a Z-axis component with respect to the interface surface α of the panel 40. The Z-axis direction is also referred to as a vertical direction with respect to the interface surface α of the panel 40. The Z-axis direction corresponds to a direction in which the user presses the interface surface α of the panel 40 or a direction in which the user releases the press. The tactile sensation providing apparatus 1 provides the tactile sensation by shifting the panel 40 in the X-axis direction with respect to the interface surface α. The X-axis direction is also referred to as a lateral direction with respect to the interface surface α of the panel 40. In the tactile sensation providing apparatus, in other words, the direction of the user operation and the direction to provide the tactile sensation differ from each other.

Experiments conducted by the applicant have confirmed that, even in the case where the tactile sensation is provided by laterally shifting the interface surface α, most people pressing the interface surface α feel the tactile sensation as if the interface surface α is moved in the pressing direction. The pressing direction is also referred to as an operation direction. In other words, by displacing the panel 40 in a direction perpendicular to the pressing direction of the user, the tactile sensation similar a click sensation depressing the panel 40 in the pressing direction of the user may be provided to the user. The pressing direction of the user corresponds to the Z-axis direction. The direction perpendicular to the pressing direction of the user corresponds to the X-axis direction. Also, when the user releases the press, by displacing the panel 40 in a direction perpendicular to a releasing direction of the press, the tactile sensation similar to a releasing sensation of the panel 40 in the direction in which the user releases the press may be provided to the user. The direction in which the user releases the press corresponds to the Z-axis direction. The direction perpendicular to the direction in which the user releases the press corresponds to the X-axis direction.

As described above, the tactile sensation providing apparatus 1 is capable of providing an operation feeling of pressing the interface surface α of the panel 40, by appropriately adjusting the voltage for driving the piezoelectric actuator, a displacement amount, and a frequency. The displacement amount is also referred to as amplitude of the bending.

The panel 40 may be easily displaced relative to the base 50. This configuration enables the tactile sensation providing apparatus 1 to efficiently provide the tactile sensation. In particular, as illustrated in FIG. 2B, for example, when the panel 40 is laterally displaced within the base 50, the friction at portions of the base 50 and the panel 40 in contact with each other are prevented from becoming large. When this friction becomes large, the panel 40 is inhibited from being laterally displaced within the base 50 and from efficiently providing the tactile sensation.

As illustrated in FIGS. 5A and 5B, the connection units 30A, 30B, and 30C connecting between the piezoelectric actuator (10, 20), the panel 40, and the base 50 may have appropriate thicknesses. The thicknesses of the connection units 30A, 30B, and 30C correspond to a length of the X-axis direction. In particular, the connection units 30A, 30B, and 30C each may have thicknesses larger than the amplitude of the bending of the piezoelectric actuator (10, 20). The amplitude of the bending of the piezoelectric actuator (10, 20) corresponds to the displacement amount in the X-axis direction.

As illustrated in FIG. 5A, when the piezoelectric actuator (10, 20) bends having the antinode in the positive X-axis direction, the connection units 30A, 30B, and 30C may have any appropriate thicknesses. As illustrated in FIG. 5B, on the other hand, when the piezoelectric actuator (10, 20) bends having the antinode in the negative X-axis direction, in the cases where thickness of the connection units 30A, 30B, and 30C is too small, bending of the piezoelectric actuator may be inhibited. For example, when the connection unit 30C has a small thickness, the longitudinal ends of the piezoelectric actuator bending with the antinode in the negative X-direction come into contact with a left-side surface of the panel 40. In this case, the piezoelectric actuator may be inhibited from bending. When the connection units 30A and 30B have small thicknesses, the longitudinal center of the piezoelectric actuator bending with the antinode in the negative X-direction contact an inner surface of the base 50. In this case, the piezoelectric actuator may be inhibited from bending.

As illustrated in FIG. 5B, the connection units 30A, 30B, and 30C may have thicknesses larger than the amplitude of the bending of the piezoelectric actuator (10, 20). This configuration may increase the amplitude of the bending when driving the piezoelectric actuator. When the amplitude of the bending is increased, the displacement amount of the panel 40 may also be increased. Thus, the tactile sensation providing apparatus 1 may efficiently provide favorable tactile sensation.

As illustrated in FIGS. 5A and 5B, the connection units 30A, 30B, and 30C may have a rigidity that does not inhibit bending of the piezoelectric actuator (10, 20). In particular, the connection units 30A, 30B, and 30C may have an elastic modulus to permit a slight deformation of an attaching surface in accordance with the bending of the piezoelectric actuator (10, 20). When the elastic modulus of the connection units 30A, 30B, and 30C is too small, there is a risk that the panel 40 may not be stably fixed to the base 50. On the other hand, when the rigidity of the connection units 30A, 30B, and 30C is too high, there is a risk that bending of the piezoelectric actuator (10, 20) is inhibited.

In the tactile sensation providing apparatus 1 according to the present embodiment, the piezoelectric actuator (10, 20) is configured to laterally shift the panel 40 with respect to the interface surface α. The tactile sensation providing apparatus 1 laterally shifts the panel 40 with respect to the interface surface α in accordance with the bending of the piezoelectric actuator (10, 20), and thus provides the tactile sensation on the interface surface α. In the tactile sensation providing apparatus 1, the connection units 30 (30A, 30B, and 30C) may have a thicknesses larger than the amplitude of the bending of the piezoelectric actuator (10, 20).

The tactile sensation providing apparatus 1 according to the present embodiment is capable of providing a uniform tactile sensation at any position on the interface surface α of the panel 40 by laterally displacing the panel 40 in its entirety. As a comparative example, an apparatus for providing a tactile sensation having a drive unit such as a piezoelectric actuator somewhere on a surface opposite to the interface surface α of the panel 40, i.e., on the rear side of the interface surface α will now be discussed. This apparatus according to the comparative example may increase the intensity of the tactile sensation near the drive unit. However, this apparatus according to the comparative example has tendency that the intensity of the tactile sensation becomes weaker at positions farther from the drive unit. Unlike the apparatus according to the comparative example, the tactile sensation providing apparatus 1 according to the present embodiment is capable of providing a uniform tactile sensation at any position on the interface surface α of the panel 40 the user is touching.

In the tactile sensation providing apparatus 1 according to the present embodiment, the piezoelectric actuator is connected to the panel 40 and the base 50 in a fixed manner at three points via the three connection units 30A, 30B, and 30C. In the tactile sensation providing apparatus 1 according to the present embodiment, both when the piezoelectric actuator is bent and when the piezoelectric actuator is not bent, the piezoelectric actuators and the panel 40 may be stably fixed to the base 50. With such a connection manner, the tactile sensation providing apparatus 1 is capable of efficiently transmitting the displacement of the piezoelectric actuator to the panel 40. The tactile sensation providing apparatus 1 according to the present embodiment is capable of increasing the displacement amount of the bend of the piezoelectric actuator and thus efficiently providing a favorable tactile sensation.

Second Embodiment

Figure 6:
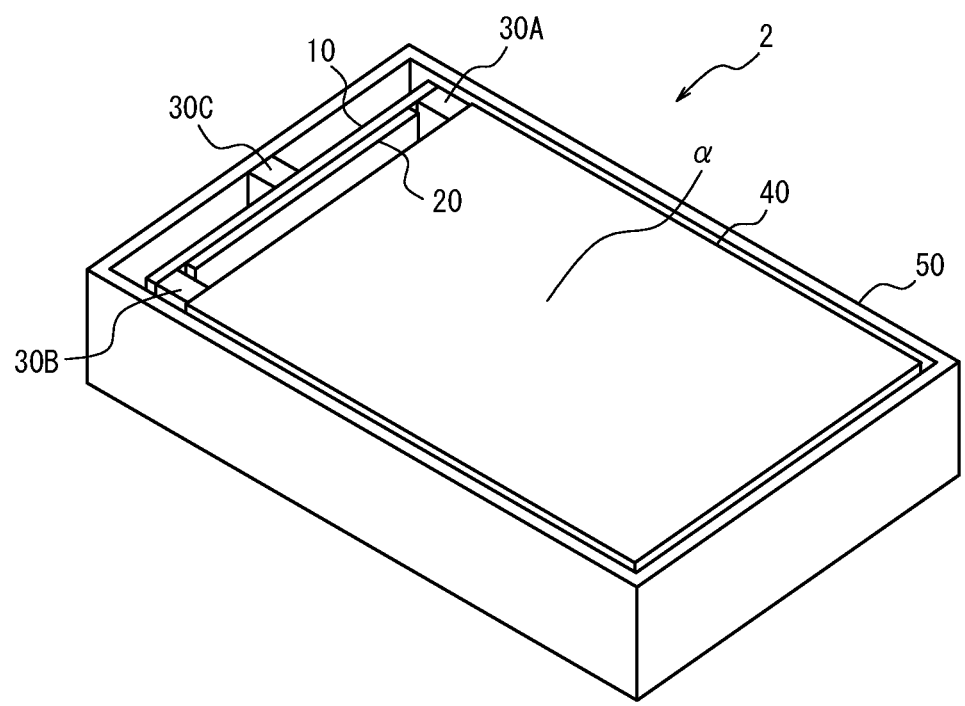
FIG. 6 is a perspective view of an appearance of a tactile sensation providing apparatus according to a second embodiment.
Figure 7A:
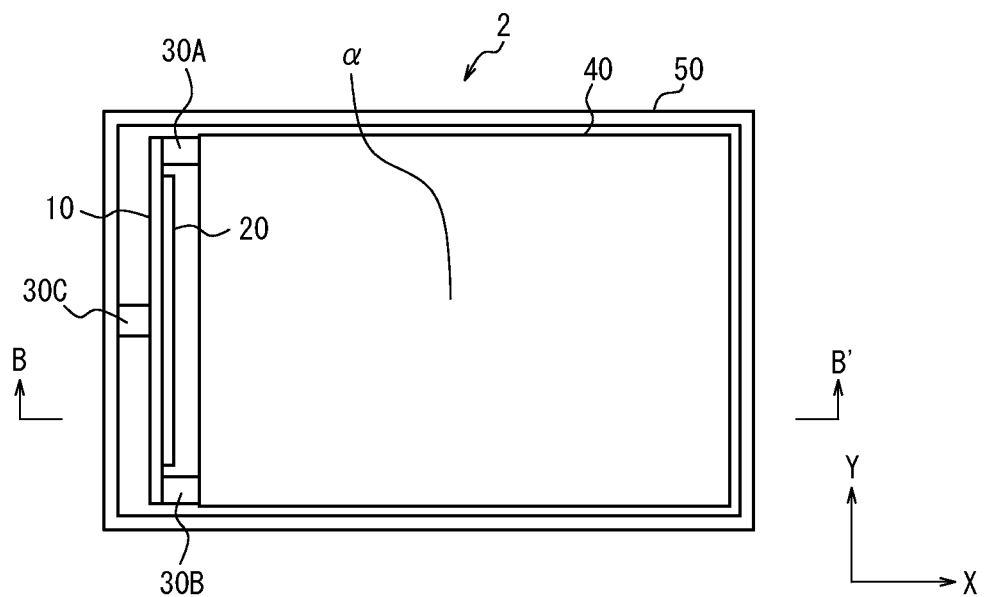
FIG. 7A is a top view of the tactile sensation providing apparatus of FIG. 6 viewed in the negative Z-axis direction.
Figure 7B:
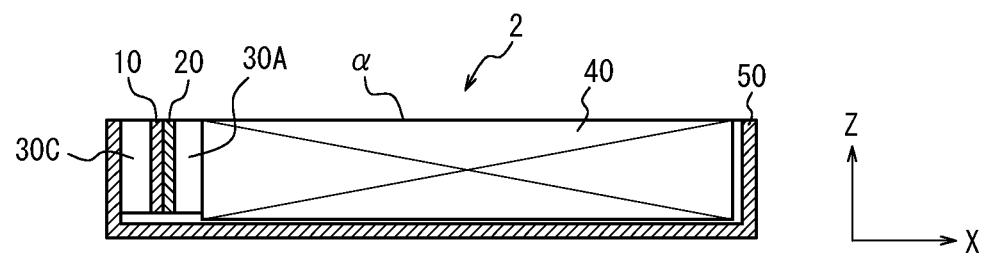
FIG. 7B is a cross-sectional view taken from line B-B' of FIG. 7A.

As illustrated in FIGS. 6, 7A, and 7B, a tactile sensation providing apparatus 2 according to a second embodiment has a connection state of the piezoelectric actuator (10, 20), panel 40, and the base 50 different from that of the tactile sensation providing apparatus 1 according to the first embodiment described above. Other than the connection state, the tactile sensation providing apparatus 2 according to the second embodiment may have the same configuration as the tactile sensation providing apparatus 1 according to the first embodiment described above. The same descriptions as those of the tactile sensation providing apparatus 1 according to the first embodiment will be omitted.

As illustrated in FIGS. 6, 7A, and 7B, in the tactile sensation providing apparatus 2 according to the second embodiment, the piezoelectric actuator (10, 20) is connected to the panel 40 via the connection units 30A and 30B. The longitudinal ends of the piezoelectric actuator (10, 20) may be connected to the panel 40 via the connection units 30A and 30B. The longitudinal direction of the piezoelectric actuator (10, 20) corresponds to the Y-axis direction. The longitudinal ends of the piezoelectric actuator (10, 20) are not necessarily the exact longitudinal edges of the piezoelectric actuator (10, 20). The longitudinal ends of the piezoelectric actuator (10, 20) may be, for example, at locations in the vicinity of the ends of the piezoelectric element 20 or in the vicinity of the ends of the plate-like member 10. The longitudinal ends of the piezoelectric actuator (10, 20) may be, for example, rather than at the longitudinal edges thereof, at two locations spaced apart from each other by a certain distance in the longitudinal direction of the piezoelectric actuator. The longitudinal ends of the piezoelectric actuator (10, 20) located close to the longitudinal edges of the piezoelectric actuator (10, 20) may increase the amplitude caused by the bend of the piezoelectric actuator.

As illustrated in FIGS. 6, 7A, and 7B, the piezoelectric actuator (10, 20) is connected to the base 50 via the connection unit 30C. The piezoelectric actuator (10, 20) may be connected to the base 50 via the connection unit 30C at the longitudinal center of the piezoelectric actuator. The longitudinal center of the piezoelectric actuator (10, 20) does not necessarily need to be the exact center of the piezoelectric actuator (10, 20) in the longitudinal direction. As the longitudinal center of the piezoelectric actuator (10, 20) is closer to the center of the longitudinal direction of the piezoelectric actuator (10, 20), the amplitude caused by bending of the piezoelectric actuator may become larger.

The longitudinal ends of the piezoelectric actuator (10, 20) may correspond to end portions of the plate-like member 10 or end portions of the piezoelectric element 20. Similarly, the longitudinal center of the piezoelectric actuator (10, 20) may correspond to the center of the plate-like member 10 or the center of the piezoelectric element 20.

As described above, the tactile sensation providing apparatus 2 according to the present embodiment may include the connection units 30 (30A, 30B, and 30C) connecting at least one of the base 50 and the panel 40 to the piezoelectric actuator (10, 20).

In the tactile sensation providing apparatus 2 according to the present embodiment, as described above, the longitudinal center of the piezoelectric actuator (10, 20) and the base 50 may be connected. In the tactile sensation providing apparatus 2 according to the present embodiment, the longitudinal ends of the piezoelectric actuator (10, 20) and the panel 40 may be connected.

Figure 8A:
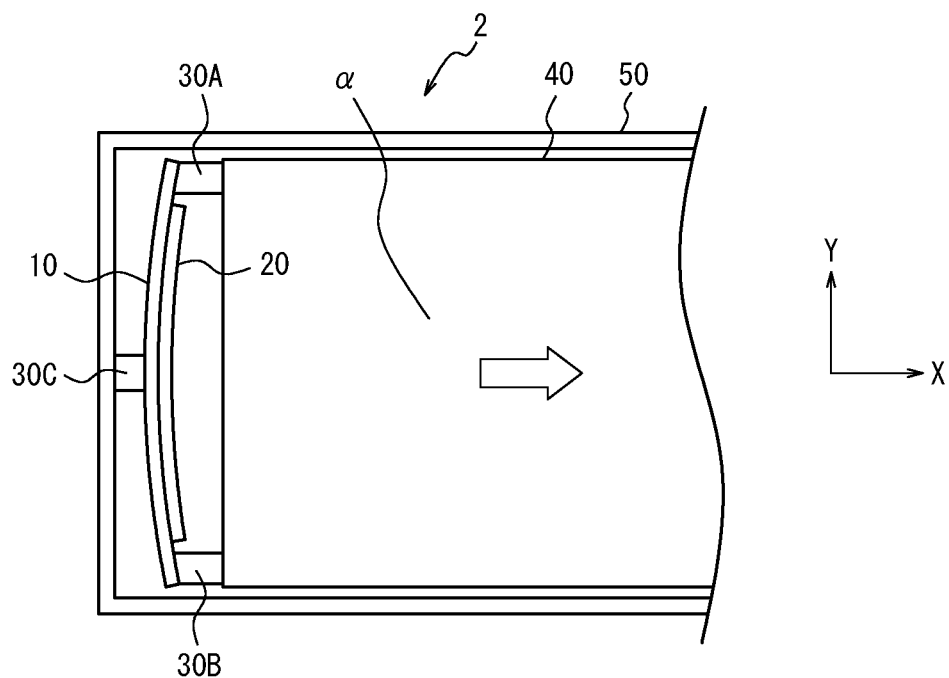
FIG. 8A is a diagram illustrating a state of the tactile sensation providing apparatus according to the second embodiment in which the panel 40 is displaced in the positive X-axis direction in response to application of a voltage to the piezoelectric element.
Figure 8B:
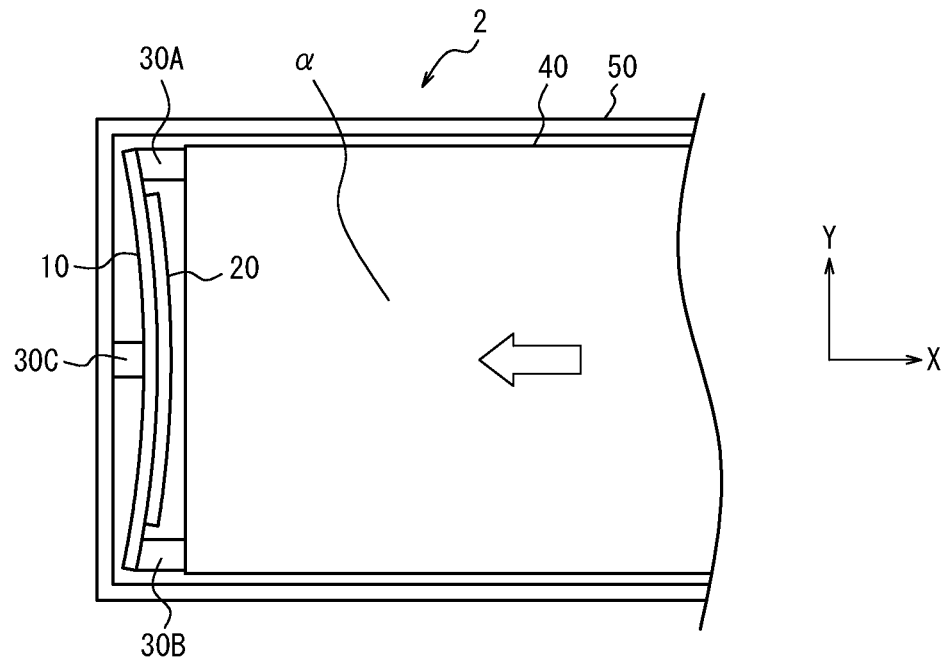
FIG. 8B is a diagram illustrating a state of the tactile sensation providing apparatus according to the second embodiment in which the panel 40 is displaced in the negative X-axis direction in response to the application of the voltage to the piezoelectric element.

As illustrated in FIGS. 8A and 8B, the tactile sensation providing apparatus 2 according to the second embodiment is capable of operating in a manner similar to the tactile sensation providing apparatus 1 according to the first embodiment. The tactile sensation providing apparatus 2 according to the second embodiment is capable of efficiently providing a favorable tactile sensation.

Although the present disclosure is described based on various drawings and the embodiments, it is to be understood that those skilled in the art may easily carry out various modifications or alterations based on disclosure of the present invention. Accordingly, such modifications and alternations are included in the scope of the present disclosure. For example, a function included in each functional unit, or each means may be rearranged avoiding a logical inconsistency, such that a plurality of functional units are combined or divided. The present disclosure should not be construed as being limited to precise implementation of the above embodiments but may be implemented by appropriately combining, or appropriately omitting, some features.

The above embodiments omit description of the functionality of the tactile sensation providing apparatuses 1 and 2 for detection of a user input. For example, when the tactile sensation providing apparatuses 1 and 2 each include a touch sensor, whether to provide the tactile sensation may be determined on the basis of a position on the interface surface α of the panel 40 in contact with the user's finger and the like. For example, when the tactile sensation providing apparatuses 1 and 2 each include a display such as an LCD, a position where the user's fingertip and the like should touch may be indicated on the interface surface α of the panel 40. For example, when the tactile sensation providing apparatuses 1 and 2 each include a pressure detection unit such as a pressure sensor, a pressure applied to the interface surface α of the panel 40 by the user's fingertip and the like may be detected. In this case, whether to provide the tactile sensation may be determined on the basis of whether the detected pressure exceeds a predetermined threshold.

Determining whether to provide the tactile sensation on the basis of the detected pressure as described above enables the tactile sensation providing apparatus to avoid providing a tactile sensation in response to a light touch inadvertently made by an operator. In this way, the apparatus may inform the user that the apparatus did not regard the light touch as an input. The tactile sensation providing apparatuses 1 and 2 provide the tactile sensation when the detected pressure exceeds the predetermined threshold, and thus is capable of stimulating the user's sense of touch while stimulating the user's sense of pressure at the user's fingertip. That is, until the detected pressure exceeds the predetermined threshold, the tactile sensation providing apparatuses 1 and 2 may stimulate the sense of pressure at the user's fingertip and the like by the reaction of the pressing force. When the pressure exceeds the predetermined threshold, the tactile sensation providing apparatus 1 and 2 may drive the piezoelectric actuator with a predetermined drive signal to vibrate the interface surface α of the panel 40, and thus may stimulate the sense of touch at the user's fingertip and the like. As described above, the tactile sensation providing apparatus 1 and 2 are capable of providing a favorable realistic click sensation to the user's fingertip and the like by stimulating the user's sense of touch while stimulating the user's sense of pressure. The "click sensation" used herein means a tactile sensation similar to that acquired when a button switch such as a mechanical push button switch is pressed. The mechanical switch is also referred to as a physical switch. The push button switch is also referred to as a push-type switch.

REFERENCE SIGNS LIST

1, 2 tactile sensation providing apparatus
10 plate-like member
20 piezoelectric element
30 connection unit
40 panel
50 base

The invention claimed is:

1. A tactile sensation providing apparatus comprising:
   a base;
   a panel having an interface surface; and
   a piezoelectric actuator that is attached to the base and the panel and configured to allow lateral movement of the panel with respect to the interface surface,
   wherein the panel moves laterally with respect to the interface surface in accordance with bending of the piezoelectric actuator to provide a tactile sensation on the interface surface,
   wherein a longitudinal center portion of the piezoelectric actuator is connected to the base, and
   wherein longitudinal ends of the piezoelectric actuator are not connected to the base.

2. The tactile sensation providing apparatus according to claim 1,
   wherein the longitudinal ends of the piezoelectric actuator are connected to the panel.

3. An electronic device comprising:
   the tactile sensation providing apparatus according to claim 1.

4. The electronic device according to claim 3,
   wherein the longitudinal ends of the piezoelectric actuator are connected to the panel.

* * * * *